(12) United States Patent
Labat et al.

(10) Patent No.: US 7,023,537 B2
(45) Date of Patent: Apr. 4, 2006

(54) SYSTEM FOR MONITORING THE MOVEMENTS OF CONSTRUCTION WORK PARTS

(75) Inventors: Marie-Laure Labat, Nanterre (FR); Eric Gastine, Nanterre (FR); Martin Beth, Nanterre (FR)

(73) Assignee: SOLDATA, Nanterre (FR)

( * ) Notice: Subject to any disclaimer, the term of this patent is extended or adjusted under 35 U.S.C. 154(b) by 4 days.

(21) Appl. No.: 10/645,730

(22) Filed: Aug. 21, 2003

(65) Prior Publication Data

US 2004/0252313 A1    Dec. 16, 2004

(30) Foreign Application Priority Data

Aug. 23, 2002    (FR) .................................. 02 10521

(51) Int. Cl.
   *G01B 11/26*    (2006.01)
   *G01B 11/14*    (2006.01)
   *G01C 1/00*    (2006.01)

(52) U.S. Cl. ........................... 356/139.04; 356/139.07; 356/141.3; 356/614

(58) Field of Classification Search .............................. 356/139.04–139.08, 614, 622
   See application file for complete search history.

(56) References Cited

U.S. PATENT DOCUMENTS

| | | | | |
|---|---|---|---|---|
| 4,526,465 A | * | 7/1985 | Corti et al. ................. | 356/35.5 |
| 4,889,425 A | * | 12/1989 | Edwards et al. .......... | 356/141.3 |
| 4,889,997 A | * | 12/1989 | Tomiolo ................... | 250/559.3 |
| 5,255,565 A | * | 10/1993 | Judd et al. ................ | 73/579 |
| 5,520,052 A | * | 5/1996 | Pechersky .................. | 73/579 |
| 5,657,003 A | * | 8/1997 | Fuentes ................... | 340/690 |
| 5,850,185 A | * | 12/1998 | Canty ..................... | 340/686.1 |
| 6,240,783 B1 | * | 6/2001 | McGugin et al. ......... | 73/594 |

OTHER PUBLICATIONS

United States Army Corps of Engineer Manual EM 1110-2-1009. "Monitoring structural deformations using the global positioning system". In *Engineering and Design-Structural Deformation Strategy*. Jun. 1, 2002.

* cited by examiner

*Primary Examiner*—Thomas H. Tarcza
*Assistant Examiner*—Isam Alsomiri
(74) *Attorney, Agent, or Firm*—Merchant & Gould P.C.

(57) ABSTRACT

The invention relates to a system for monitoring the movements, if any, of construction work parts. It comprises:
   a plurality of measurement taking stations (S1, S2 . . . ) able to sight targets;
   a plurality of reference targets (c'i) linked to at least one station;
   a plurality of monitoring targets (ci) mounted on the said construction work parts, at least one of the said monitoring targets (ki) being associated with at least two stations;
   means of control (30) of each station for measuring at successive instants the coordinates of the reference targets and of the monitoring targets which are associated therewith with respect to the said station; and
   means of processing (34) the coordinates of the reference targets and of the monitoring targets computed by the said stations at the said successive instants so as to deduce therefrom a displacement, if any, of a monitoring target between two measurement instants.

16 Claims, 2 Drawing Sheets

SYSTEM FOR MONITORING THE MOVEMENTS OF CONSTRUCTION WORK PARTS

TECHNICAL FIELD

The subject of the present invention is a system for monitoring the movements, if any, of construction work parts.

More precisely, the present invention relates to a system or an installation which allows the monitoring of the movements, if any, of the various constituent elements of an engineering construction work under the effect of external causes such as land movements or risks of subsidence due for example to tunnel boring under the said engineering construction work.

The invention applies in particular but not exclusively to the monitoring of buildings in an urban area during the boring of a tunnel under these buildings. It is indeed understood that this boring may engender movements of the structure of these buildings and that it is vital to be informed thereof immediately so as to be able to remedy same.

BACKGROUND

Systems for monitoring the movements, if any, of engineering construction work parts are known which consist of an assembly made up on the one hand of a motorized theodolite and on the other hand of targets associated with the theodolite, these targets being on the one hand positioned on parts that are not liable to be affected by movements, that is to say reference targets and, on the other hand, monitoring targets that are fixed at suitable locations on the construction work parts to be monitored. The position of the reference targets may be known with high accuracy. The theodolite or similar apparatus makes it possible, by successively sighting the reference targets and the monitoring targets, to determine the coordinates in space of the reference targets and of the monitoring targets. It is indeed understood that, because the theodolite must usually be placed in the area liable to be affected by movements, it is necessary to be able to accurately determine, on the basis of the reference targets, the position of the theodolite and consequently the position of the monitoring targets.

As is well known, the theodolite is controlled so as to successively and periodically sight the reference targets and the monitoring targets, measuring for each target its polar coordinates: distance, horizontal angle, vertical angle. Usually, the theodolite is equipped with a laser beam generator and the reference and monitoring targets comprise a prism which returns the laser beam to the theodolite when the latter is correctly pointed at the target. It is thus possible to measure the polar coordinates of the reference targets and of the monitoring targets with respect to the theodolite, the Cartesian coordinates of the monitoring targets being calculated by the monitoring centre.

By comparing the coordinates of the monitoring targets for successive instants of measurement of coordinates, it is possible to detect movements, if any, even if the latter are of very small amplitude. Indeed, in order to have a reliable monitoring system, it is necessary to be able to detect displacements or movements of the order of a millimetre.

Although theodolites may have a relatively big range, it may happen, in certain situations, that the possibilities for setting up the theodolite do not make it possible, with the aid of a single theodolite, to perform the monitoring of all the construction work or of all the buildings. This is especially true in an urban area.

Furthermore, it is not always possible, in the environment of the monitoring area and in particular in the case of an urban environment, for there to be areas that are not liable to be affected by movements which allow the placement of reference targets in such a way that these targets allow the determination in three dimensions of the position of the theodolite.

There therefore exists a genuine need for a system for monitoring the movements, if any, of construction work parts which makes it possible to efficiently monitor the various parts of an engineering construction work of considerable dimensions and under conditions in which it is difficult to set up monitoring or reference targets and in particular in an urban setting.

SUMMARY OF THE INVENTION

An object of the present invention is to provide a system for monitoring the movements, if any, of engineering construction work parts which allow the monitoring of an engineering construction work of considerable dimensions even if the conditions, for example in an urban setting, are unfavourable to the placement of the theodolites and of the reference or monitoring targets.

To achieve this aim, according to the invention, the system for monitoring the movements, if any, of construction work parts is characterized in that it comprises:
  a plurality of measurement taking stations able to sight targets and capable of being mounted at least in part on the said construction work parts;
  a plurality of reference targets linked to at least one station;
  a plurality of monitoring targets mounted on the said construction work parts, at least some of the said monitoring targets being associated with at least two stations;
  means of control of each station for measuring at successive instants the coordinates, preferably the polar coordinates, of the reference targets and of the monitoring targets which are associated therewith with respect to the said station; and
  means of processing the coordinates of the reference targets and of the monitoring targets computed by the said stations at the said successive instants so as to deduce therefrom a displacement, if any, of a monitoring target between two measurement instants.

It is understood that the monitoring system according to the invention comprises a plurality of measurement taking stations, for example of motorized theodolites, which may therefore be deployed suitably to allow the monitoring of all of the engineering construction work. However, because, with the various measurement taking stations there is always associated at least one monitoring target corresponding to at least two measurement taking stations, it is possible to couple, during the mathematical processing of the measured coordinates of the monitoring targets and of the reference targets, the information relating to the position of the whole set of these targets. It is thus possible to circumvent situations in which it would not be possible to set in place a sufficient number of reference targets associated with each measurement taking station. Stated otherwise, the measurement taking stations are intercoupled by way of the monitoring stations common to two or more of two measurement taking stations.

From a practical point of view, in order for it to be possible for a monitoring target to be "seen" by two measurement taking stations, it may be necessary for this target to be double. For example, the target will comprise two prisms whose relative positions are strictly fixed.

In the present text, the expression "monitoring target" should therefore be understood to mean either a simple target or a double target.

Furthermore, it should be pointed out that the reference targets are not necessarily strictly fixed. It is sufficient that their precise position can be determined and reset from time to time.

According to a preferred mode of implementation, the monitoring system furthermore comprises:

a monitoring centre comprising the said processing means; and means for transmitting from each station to the said monitoring centre the said polar coordinates of the monitoring and reference targets measured by the said stations at the said successive instants.

It is understood that, in this preferred embodiment, the monitoring system furthermore comprises a monitoring centre which is connected by any suitable means, for example by radio transmission, to the various measurement taking stations in such a way that this monitoring centre receives, at predetermined successive instants, the relative coordinates of the reference targets and of the monitoring targets measured by the various measurement taking stations. This monitoring centre comprises the means of mathematical processing of the various information items received, this making it possible in tandem with the receipt of the set of measurements performed by the various measurement taking stations at each instant to correlate, for example by the method of least squares, the measurements performed so as to optimize the determination of the absolute coordinates of the monitoring targets on account of the redundancy of the information. The calculation of the absolute effective coordinates of the various monitoring targets makes it possible to detect in real time a movement, if any, of a part of the engineering construction work associated with one of the monitoring targets.

BRIEF DESCRIPTION OF THE FIGURES

Other characteristics and advantages of the invention will become better apparent on reading the description which follows of several embodiments of the invention, given by way of nonlimiting examples. The description makes reference to the appended figures, in which.

DETAILED DESCRIPTION

Figure 1:
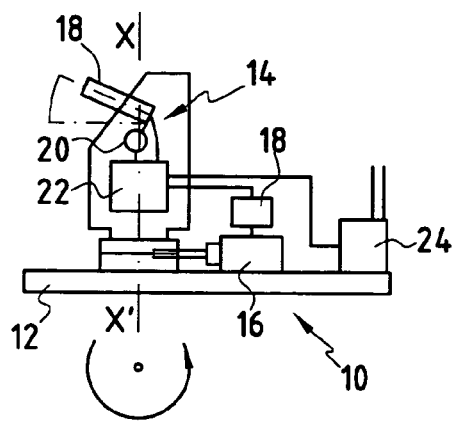
FIG. 1 is a simplified view of an exemplary embodiment of a measurement taking station.

Referring firstly to FIG. 1, an exemplary embodiment of a measurement taking station built around a motorized theodolite will be described. However, it goes without saying that the invention could be implemented with other measurement taking stations so long as the latter make it possible to determine the relative polar coordinates of the various reference or monitoring targets corresponding to the measurement taking station.

The station 10 comprises a base or chassis 12 that can be fixed at a suitable location on the construction work in order to perform the monitoring. Mounted on this chassis 12 is a theodolite 14 rotatable about the vertical axis XX'. The rotation of the theodolite 14 with respect to the chassis 12 can be controlled by a motor 16 associated with a control circuit 18. The theodolite 14 comprises in particular an optic for emitting a laser beam 18 mobile about a horizontal axis cutting the vertical axis XX'. The laser beam emitted by the optic 18 makes it possible to sight the targets by suitably controlling the motor 18 and an actuator 20 for rotating the optic about the horizontal axis. This system can be servo-controlled and programmed to successively sight various targets at predetermined instants. In the station there are also processing and memory circuits such as 22 which make it possible to temporarily store, for each sighting of a target, the identification of the reference or monitoring target as well as the polar coordinates of this target with respect to the theodolite. The measurement taking station 10 also comprises a radio emitter 24, or analogue means of transmission, capable of emitting, whenever a measurement of the coordinates of the targets associated with the station is taken, the identification of each target as well as its relative polar coordinates.

Figure 2:
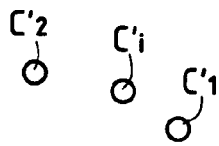
FIG. 2 is a diagram showing the setup of reference targets and of monitoring targets around a measurement taking station.
Figure 2:
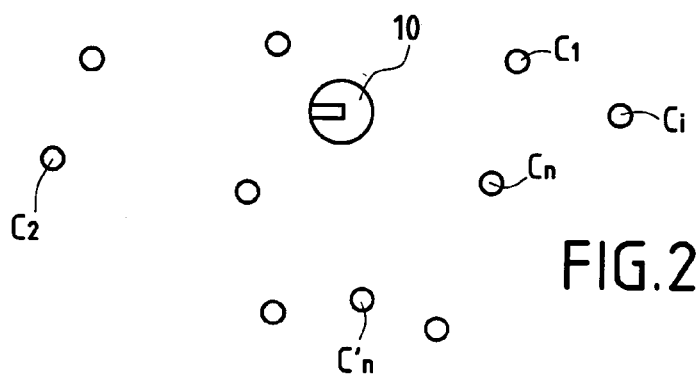

Represented in FIG. 2 is an exemplary setup of monitoring targets $C_i$ and of reference targets $C'_i$ around a station 10. The monitoring targets $C_i$ are fixed on the various parts of the construction work which is liable to undergo movements. On the other hand, the reference targets $C'_i$ are arranged and fixed on parts of the environment of the construction work that are not a priori liable to be affected by movements. Furthermore, through any suitable means, the absolute position of the reference targets $C'_i$ is known with high accuracy. The position of the reference targets is not necessarily strictly fixed, although the targets are mounted in links outside the area affected by the movements. It suffices that the exact position of these targets can be reset periodically. It is necessary for the reference targets $C'_i$ to be arranged in such a way that they allow absolute charting in three dimensions of the measurement taking station 10. The monitoring targets $C_i$ may of course be arranged in the effective field of action of the theodolite and in particular therefore in direct line of sight of the station.

It is understood that the conditions imposed in respect of the reference targets and the monitoring targets imply that it is impossible to monitor a big construction work with the aid of a single measurement taking station.

Figure 3:
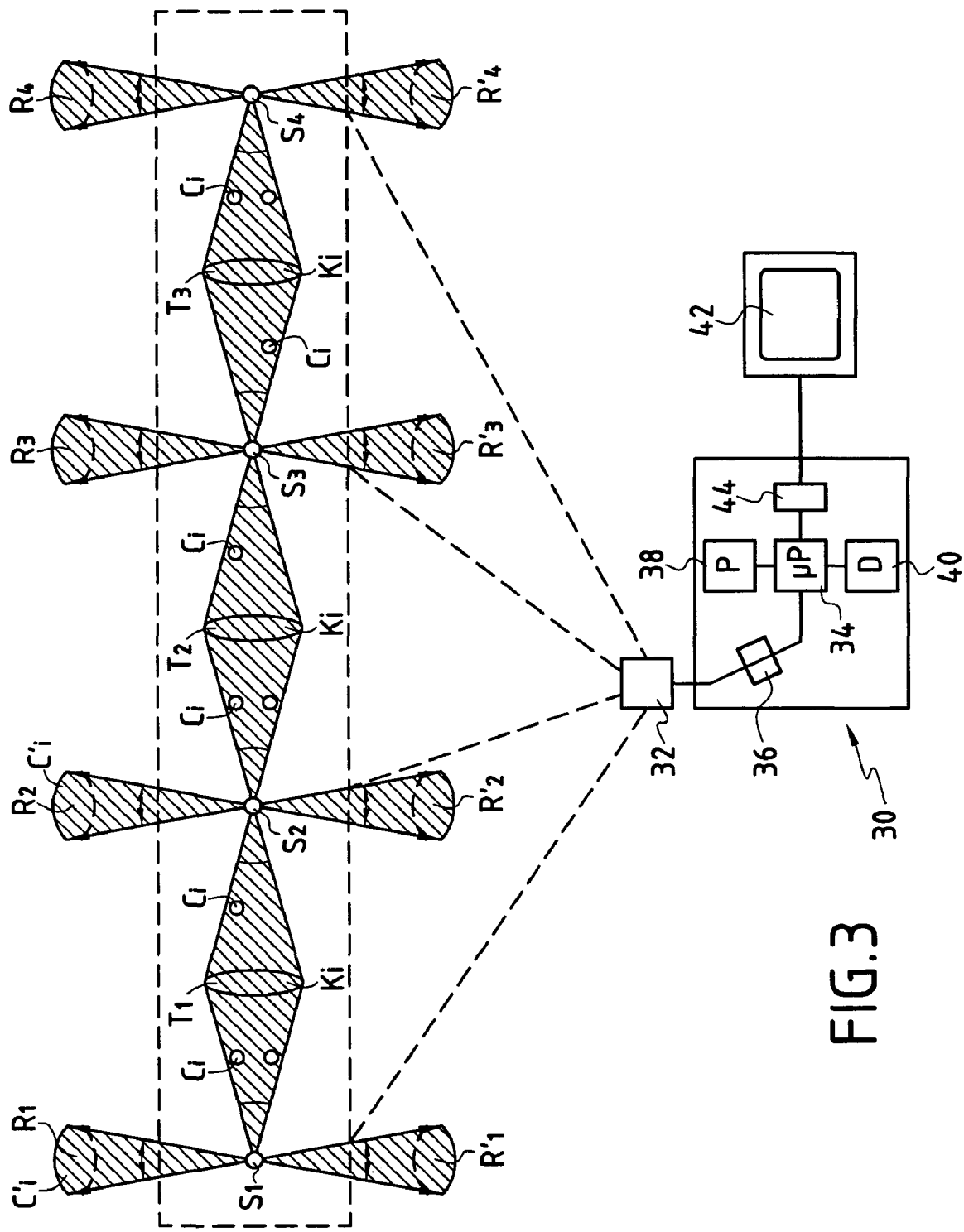
FIG. 3 illustrates the whole of the monitoring system in a first configuration.

Referring now to FIG. 3, the whole of the monitoring system in accordance with the invention will be described in a first configuration. The area H of the engineering construction work whose movements, if any, have to be monitored and detected has been represented by dashes. One is concerned for example with a street under which a tunnel is being drilled, in an urban environment.

Represented in a simplified manner in this figure are several measurement taking stations $S_1$, $S_2$, $S_3$, $S_4$. These measurement taking stations are fixed at sites which are liable to be affected by movements so as to be able effectively to sight monitoring targets. Likewise represented in FIG. 3 are areas $R_1$, $R'_1$ associated with the station $S_1$ and in which reference targets $C'_i$ are arranged. In the same manner, reference targets associated with the station $S_2$ are arranged in the areas $R_2$ and $R'_2$, reference targets associated with the station $S_3$ are arranged in the areas $R_3$ and $R'_3$ and with the station $S_4$ are associated reference targets arranged in the areas $R_4$ and $R'_4$.

With each measurement taking station $S_i$ are also associated monitoring targets $C_i$ which are fixed on parts of the construction work to be monitored that are liable to be affected by movements, these targets $C_i$ being of course arranged in the sighting field of the theodolites of the stations considered. Particular monitoring targets $K_i$ are envisaged, that are arranged in areas $T_1$, $T_2$, $T_3$ that are situated in the sighting field of two adjacent measurement taking stations. Each area $T_1$, $T_2$, $T_3$ comprises several double targets $K_i$. It is understood that each target of the type $K_i$ forms the subject of the taking of relative coordinates by two adjacent stations, this making it possible to effect a coupling between the taking of coordinates of the whole set of reference and monitoring targets associated with two measurement taking stations, and hence with the whole set of measurement taking stations.

Figure 4:
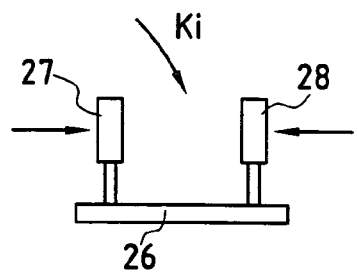
FIG. 4 is a diagrammatic view of the double target used for the monitoring targets common to two measurement taking stations.

Since it is desirable for the targets to be arranged substantially perpendicularly to the laser beam of the station associated with them, the targets of the type $K_i$ have a particular structure represented in FIG. 4. These targets are in fact double. They comprise a rigid stand 26 on which are mounted two targets of standard type 27 and 28. The monitoring targets 27 and 28 may be suitably oriented with respect to the two theodolites of the stations which will measure their coordinates. However, the relative coordinates of the targets 27 and 28 are fixed and in particular the distance which separates these two targets is fixed. This particular feature will of course be incorporated into the calculation of the absolute coordinates of the monitoring targets.

The expression monitoring target should therefore be understood to mean simple, double or even possibly triple targets.

The monitoring system comprises, in addition to the measurement taking stations and the reference or monitoring targets, be they simple or double, a monitoring centre 30. This monitoring centre 30 is equipped for example with radio receiver means 32 for receiving the relative coordinates measured by the various stations and transmitted by the radio emitter 24 associated with them. This transmission of information from all the stations $S_i$ to the centre 30 is carried out at each measurement taking period by the stations. The centre 30 comprises in particular logic and digital processing means 34, for example a microprocessor, connected to the radio receiver 32 by storage and shaping circuits 36, permanent program memories 38, random access calculation memories and nonvolatile data memories 40. The monitoring centre also comprises display means 42 making it possible, for example, to display for each measurement instant the calculated absolute coordinates of the various monitoring targets with indication of the target considered. As will be explained later, the display means make it possible to display an alarm signal in the case where a movement of one of the monitoring targets is detected which exceeds a predetermined threshold. The display means 42 are connected to the logic processing unit 34 by a control circuit 44.

The whole system operates as follows:

at each measurement instant, the theodolites of the measurement taking stations are ordered to log the relative polar coordinates of the reference targets, of the simple monitoring targets and of the double monitoring targets which are associated with them. This coordinate information is transmitted at each measurement period to the monitoring centre 30. These various relative coordinates taken by the theodolites are processed by the logic processing unit 34 which implements a mathematical processing algorithm stored in the permanent memory 38. As will be explained in greater detail later, the algorithm is of the least squares type. For each series of measurements of relative coordinates, one obtains, by processing with the aid of the program, the absolute coordinates of the various monitoring targets be they simple or double, these absolute coordinates resulting in particular from the correlation between the measurements made by the stations by virtue of the double targets $K_i$. These absolute coordinates of the monitoring targets are stored in the memory 40 and can be displayed on the display device 42. During the next measurement cycle, the same process occurs, this making it possible to obtain the absolute coordinates of the various monitoring targets. Comparison with a reference state of these absolute coordinates of the various monitoring targets obtained at each measurement cycle makes it possible to detect in real time a movement, if any, of one of the monitoring targets and therefore to trigger an alert. The periodicity of the measurements is determined as a function of the feedback sought in the monitoring.

It is also important to stress that the invention allows global processing of the various measurement taking stations and hence of the whole of the installation.

The setup, illustrated in FIG. 3, of the targets, both reference and monitoring, corresponds to a favourable configuration on account of the fact that it is possible to associate, with each measurement taking station, fixed reference targets. The set up represented in FIG. 3 corresponds for example to the monitoring of the buildings along a main street, the reference targets being mounted on buildings in perpendicular roads outside of the area liable to be affected by the movements.

As already indicated, the mathematical processing of the relative polar coordinates of "mobile" monitoring and of the fixed reference targets from the likewise "mobile" measurement taking stations, which are redundant, is carried out by the method of least squares.

This method, which is well known in itself and is used in numerous fields, makes it possible to manage information, in redundant number, acquired with risks of error. On account of the redundancy of the information, it makes it possible to detect the errors and to improve the accuracy of the results obtained.

The calculation is iterative: a first calculation makes it possible to establish a tailored set of solutions on the basis of an approximate set of solutions established on the basis of external elements. The tailored set of solutions is then used as approximate set of values and so on and so forth until the convergence factor converges according to an accuracy fixed in advance. The set of solutions that are adopted is that which minimizes the sum of the squares of the residuals corresponding to each coordinate.

During this mathematical processing, it is possible to detect automatically whether certain targets regularly exhibit a bigger residual than the other targets. These discrepancies are generally attributable to artefacts affecting the logging of the position of these targets, these artefacts possibly being spurious reflections of the laser beams, disturbances of the optical path of the laser beams, etc.

It is thus possible to automatically identify the targets corresponding to bigger residuals via a mathematical processing of these residuals. These targets are then deactivated and the mathematical processing is resumed, ignoring the measurements involving these targets. Thus, it is understood that the configuration of the network of stations can be managed dynamically.

The reference targets have accurately known absolute coordinates whereas the monitoring targets and the measurement taking stations are "mobile". The position of the stations is recalculated each time from the reference targets.

The great advantage of the use of the method of least squares within the framework of the present invention is the ability to process calculations blockwise. It allows the calculation of theodolites that can see no or few reference targets, tying them to other theodolites via double monitoring targets $K_i$.

Figure 5:
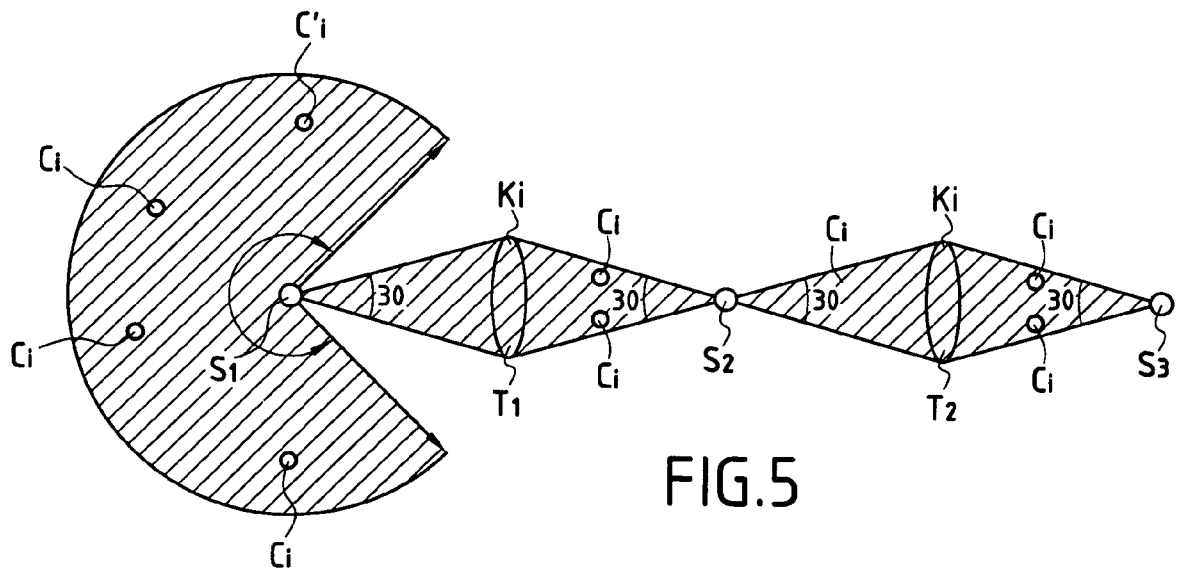
FIG. 5 shows a second exemplary implementation.

In certain cases, one may not benefit from this favourable situation. This will be the case, for example, when it is not possible to associate a sufficient number of fixed reference targets with each measurement taking station. This is the case illustrated by FIG. 5. Represented in this figure is a first measurement taking station $S_1$ with which are associated a plurality of fixed reference targets $C'_i$ and monitoring targets $C_i$ arranged in the area U of sighting of the theodolite of station $S_1$. On the other hand, for the measurement taking stations $S_2$ and $S_3$, there is no possibility of setting up reference targets. Monitoring targets $C_i$ are of course associated with each of the stations $S_2$ and $S_3$. Furthermore, in the areas common to two adjacent measurement taking stations $T_1$ and $T_2$ are fixed double targets $K_i$. In particular, in the area $T_1$ are mounted double monitoring targets in the fields of action of station $S_1$ and of station $S_2$ whereas double targets are mounted in the area $T_2$ common to the two stations $S_2$ and $S_3$. The remainder of the monitoring system is identical to that which is represented in FIG. 3, in particular as regards the monitoring centre.

It is understood that in this configuration and despite the absence of reference targets in respect of stations $S_2$ and $S_3$, it will be possible to perform this monitoring and hence the determination of the absolute coordinates of the monitoring targets $C_i$ in the areas corresponding to stations $S_2$ and $S_3$ by virtue of the correlation between the measurements resulting from the placing of the double targets $K_i$ in the areas common to two measurement stations $T_1$ and $T_2$. There must of course be a sufficient number of double targets $K_i$.

It should be stressed that, by virtue of the presence of at least one double monitoring target, visible from two measurement taking stations, the system can operate in the case where a measurement taking station is not connected to a sufficient number of reference targets or it is connected to poorly distributed reference targets.

Furthermore, as indicated previously by a target-associated mathematical processing of the residuals, during the implementation of the method of least squares, it is possible to identify the targets the logging of whose position is affected by artefacts and to ignore the measurements involving the targets thus identified in calculating the polar coordinates of the other targets. It is thus possible to carry out dynamic management of the monitoring system.

The invention claimed:

1. A system for monitoring movements of construction work parts, the system comprising:
   a plurality of measurement taking stations configured to sight targets, at least one of the measurement taking stations being configured to mount at least in part on and to move with the construction work parts;
   a plurality of reference targets linked to at least one of the plurality of stations;
   a plurality of monitoring targets mounted on said construction work parts, at least one of said monitoring targets being associated with at least two stations;
   means for controlling each station to measure at successive instants coordinates of the reference targets and coordinates of the monitoring targets associated with said station; and
   means for processing the coordinates of the reference targets and of the monitoring targets at said successive instants to deduce a displacement, if any, of one of the monitoring targets between two of the instants.

2. The system according to claim 1, further comprising:
   a monitoring centre including said processing means; and
   means for transmitting from each station to said monitoring centre said coordinates of the monitoring targets and the coordinates of the reference targets measured by said stations at said successive instants.

3. The system according to claim 2, wherein said processing means apply, for each instant, a mathematical algorithm to each of the measured coordinates of the reference targets and each of the measured coordinates of the monitoring targets measured by each station.

4. The system according to claim 3, wherein said mathematical algorithm is a method of least squares for calculating for each instant an absolute position in space of each of the monitoring targets, and said processing means further include means for comparing the absolute position of each monitoring target at the successive measurement instants.

5. The system according to claim 4, wherein said processing means further include means for identifying at least one of the reference targets, and the monitoring targets, corresponding to residuals obtained by the method of least squares greater than those of the other targets, and means for ignoring the measurements of the identified targets.

6. The system according to claim 1, wherein at least two monitoring targets are associated with each station, each monitoring target also being associated with another station.

7. The system according to claim 6, wherein each monitoring target associated with two stations includes two target elements mounted on a construction work part such that a distance between the two target elements is fixed, wherein one of the two stations measures the coordinates of one of the target elements and the other station measures the coordinates of the other target element.

8. The system according to claim 1, wherein said coordinates are polar coordinates.

9. A system for monitoring movement of a structure, the system comprising:
   a plurality of measurement taking stations configured to sight targets, at least one of the measurement taking stations being configured to mount to the structure;
   a plurality of reference targets, each reference target linked to at least one of the plurality of stations; and
   a plurality of monitoring targets mounted on the structure, at least one of the monitoring targets arranged and configured to be sighted by at least a first and second measurement taking station;
   wherein each measurement taking station measures at successive instants coordinates of at least one of the plurality of reference targets and coordinates of at least one of the plurality of monitoring targets; and
   wherein the coordinates of the reference targets and the coordinates of the monitoring targets are processed at the successive instants to determine whether one of the monitoring targets has been displaced between two of the successive instants.

10. The system according to claim 1, further comprising:
a monitoring centre including a processor for processing the coordinates of the monitoring targets and reference targets; and
a transmitter for transmitting from each station to the monitoring centre the coordinates of the monitoring targets and the coordinates of the reference targets measured by the stations at the successive instants.

11. The system according to claim 10, wherein the processor applies, for each measurement instant, a mathematical algorithm to each of the coordinates of the reference targets and each of the coordinates of the monitoring targets measured by each station.

12. The system according to claim 11, wherein the mathematical algorithm is a method of least squares for calculating for each measurement instant an absolute position in space of each of the monitoring targets, and the processor compares the absolute position of each monitoring target at each successive instant.

13. The system according to claim 12, wherein the processor identifies at least one of the reference targets and the monitoring targets corresponding to residuals obtained by the method of least squares greater than those of the other targets, and ignores the measurements of the identified targets.

14. The system according to claim 9, wherein at least two monitoring targets are associated with each station, each monitoring target also being associated with another station.

15. The system according to claim 14, wherein each monitoring target associated with two stations includes a first and a second target element mounted on a structure to be monitored such that a distance between the first and second target elements is fixed, wherein one of the two stations measures the coordinates of the first target element and the other station measures the coordinates of the second target element.

16. The system according to claim 9, wherein the coordinates are polar coordinates.

* * * * *